US011088605B2

(12) United States Patent
Kameyama

(10) Patent No.: US 11,088,605 B2
(45) Date of Patent: Aug. 10, 2021

(54) MAGNET GENERATOR WITH RESIN-MADE CEILING

(71) Applicant: MAHLE Electric Drives Japan Corporation, Numazu (JP)

(72) Inventor: Masato Kameyama, Numazu (JP)

(73) Assignee: MAHLE ELECTRIC DRIVES JAPAN CORPORATION, Numazu (JP)

( * ) Notice: Subject to any disclaimer, the term of this patent is extended or adjusted under 35 U.S.C. 154(b) by 23 days.

(21) Appl. No.: 16/337,943

(22) PCT Filed: Oct. 31, 2016

(86) PCT No.: PCT/JP2016/082272
§ 371 (c)(1),
(2) Date: Mar. 29, 2019

(87) PCT Pub. No.: WO2018/070054
PCT Pub. Date: Apr. 19, 2018

(65) Prior Publication Data
US 2020/0028420 A1    Jan. 23, 2020

(30) Foreign Application Priority Data
Oct. 12, 2016   (JP) .............................. JP2016-200981

(51) Int. Cl.
*H02K 21/22*    (2006.01)
(52) U.S. Cl.
CPC .................................. *H02K 21/222* (2013.01)
(58) Field of Classification Search
CPC ......... H02K 21/222; H02K 1/27; H02K 21/22
(Continued)

(56) References Cited

U.S. PATENT DOCUMENTS 3,828,754 A * 8/1974 Carlsson ................. F02P 1/086
123/149 D
4,116,188 A * 9/1978 Nagasawa ............... F02P 1/086
123/603
(Continued)

FOREIGN PATENT DOCUMENTS

CN    1685589 A    10/2005
JP    53-93611 U    7/1978
(Continued)

OTHER PUBLICATIONS

ZiadSalibi, "Performance of reinforced thermosetting resin pipe systems in desalination applications: a long-term solution to corrosion", the European Conference on Desalination and the Environment: Water Shortage. Lemesos, Cyprus, May 28-31, 2001.*
(Continued)

*Primary Examiner* — John K Kim
(74) *Attorney, Agent, or Firm* — Mattingly & Malur, PC

(57) ABSTRACT

The present invention provides a magnet generator that can reduce a mass without lowering a desired inertia and can prevent an engine from being locked by vibration or impact in a high rotation speed region. In a magnet generator including a rotor including a bowl-like flywheel having a cylindrical section and a ceiling section, a plurality of permanent magnets arranged over the inner circumferential wall surface of the cylindrical section, and a boss arranged in the center of the ceiling section and attached to an output shaft of an engine, and a stator facing the permanent magnets, fixed to the engine side inside the flywheel and including laminated steel plates and coils, wherein at least a part of the ceiling section of the flywheel is formed of a synthetic resin and the remaining part is formed of a metal.

15 Claims, 10 Drawing Sheets

(58) Field of Classification Search
USPC .......................................................... 310/74
See application file for complete search history.

(56) References Cited

U.S. PATENT DOCUMENTS

| | | | | | |
|---|---|---|---|---|---|
| 4,219,752 | A | * | 8/1980 | Katou | H02K 1/2786 310/153 |
| 4,244,337 | A | * | 1/1981 | Asai | F02P 11/02 123/603 |
| 6,429,564 | B1 | * | 8/2002 | Uemura | H02K 1/2786 123/149 D |
| 7,145,274 | B2 | * | 12/2006 | Uemura | H02K 1/2786 310/74 |
| 7,294,942 | B2 | * | 11/2007 | Lee | D06F 37/304 310/43 |
| 7,342,333 | B2 | * | 3/2008 | Umezu | H02K 1/2786 310/58 |
| 7,696,658 | B2 | * | 4/2010 | Hashiba | H02K 9/06 310/61 |
| 2002/0033647 | A1 | * | 3/2002 | Uemura | H02K 21/222 310/156.12 |
| 2005/0127775 | A1 | * | 6/2005 | Lee | H02K 1/148 310/43 |
| 2006/0250034 | A1 | * | 11/2006 | Umezu | H02K 9/06 310/67 R |
| 2007/0096576 | A1 | | 5/2007 | Hashiba | |
| 2007/0222322 | A1 | * | 9/2007 | Yokota | H02K 15/12 310/214 |
| 2007/0236093 | A1 | * | 10/2007 | Kihara | H02K 1/2786 310/156.19 |
| 2009/0284087 | A1 | * | 11/2009 | Takahashi | H02K 7/1815 310/62 |
| 2011/0095632 | A1 | * | 4/2011 | Tsutsui | F16C 17/107 310/90 |
| 2012/0025665 | A1 | * | 2/2012 | Takahashi | H02K 1/146 310/216.094 |
| 2013/0307353 | A1 | * | 11/2013 | Maekawa | H02K 1/2786 310/43 |
| 2014/0191628 | A1 | * | 7/2014 | Nakano | H02K 11/225 310/68 B |
| 2016/0156233 | A1 | * | 6/2016 | Yoon | H02K 1/2786 310/43 |
| 2018/0286532 | A1 | * | 10/2018 | Oya | H01B 3/30 |
| 2020/0028420 | A1 | * | 1/2020 | Kameyama | H02K 21/222 |

FOREIGN PATENT DOCUMENTS

| | | |
|---|---|---|
| JP | 02-97873 U | 8/1990 |
| JP | 10-225033 A | 8/1998 |
| JP | 2002-101630 A | 4/2002 |
| JP | 2007-129818 A | 5/2007 |

OTHER PUBLICATIONS

International Search Report of PCT/JP2016/082272 dated Jan. 10, 2017.
Chinese Office Action received in corresponding Chinese Application No. 201680090083.5 dated May 12, 2020.
Japanese Office Action received in corresponding Japanese Application No. 2018-544674 dated Mar. 24, 2020.
Chinese Office Action received in corresponding Chinese Application No. 201680090083.5 dated Oct. 29, 2020.
Chinese Office Action received in corresponding Chinese Application No. 201680090083.5 dated Feb. 26, 2021.

* cited by examiner

FIG. 14
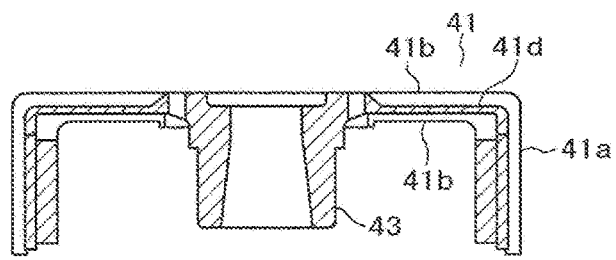
FIG. 15
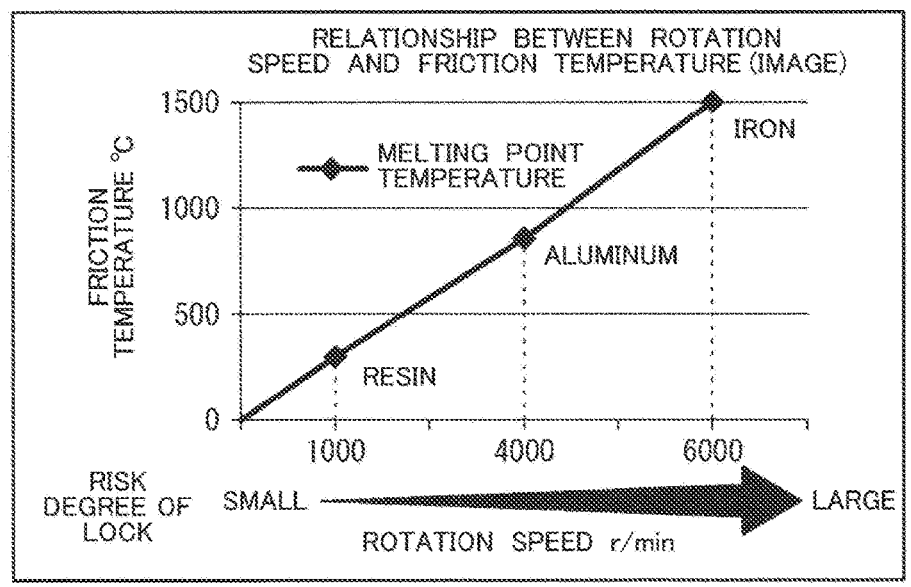
FIG. 16
| | MASS | MAGNET-ISM | HEAT CON-DUCTION | HARDNESS (IMPACT RESIST-ANCE) | TOUGH-NESS | HEAT RESIST-ANCE | HEAT RESIST-ANCE | SPECIFIC STREN-GTH | FRICTION COEFF-ICIENT |
|---|---|---|---|---|---|---|---|---|---|
| IRON | LARGE | EXISTENT | LARGE | MEDIUM | MEDIUM | MEDIUM | MEDIUM | MEDIUM | SMALL |
| RESIN | SMALL | NON-EXISTENT | SMALL | SMALL | LARGE | SMALL | SMALL | LARGE | LARGE |

MAGNET GENERATOR WITH RESIN-MADE CEILING

TECHNICAL FIELD

The present invention relates to a magnet generator to generate AC voltage (hereunder referred to as ACG) by electromagnetic induction action between permanent magnets and power generation coils caused by the rotation of a flywheel by a prime mover such as an engine.

BACKGROUND ART

A magnet generator, as this kind of an ACG for example, that is attached to a vehicle such as a motorcycle and generates electricity is generally contained in a crankcase beside a vehicle engine. Then the magnet generator is stored in a narrow space for the downsizing of a vehicle and a space between a rotating flywheel and the inner wall of a crankcase is very small.

In general, the mounting method of a flywheel is classified into two kinds of positive taper mounting and reverse taper mounting and they are shown in FIGS. 17 and 18 respectively. In the positive taper mounting of FIG. 17, a bowl-like flywheel 102 is arranged so as to direct the open side of the flywheel 102 toward an engine 101 and a boss 104 of the flywheel 102 is connected to a rotation axis (output shaft) 103 of the engine.

A plurality of permanent magnets 105 are fixed to and along the inner circumferential side of a cylindrical section 102a of the flywheel 102. Meanwhile, a stator 106 that faces the permanent magnets and includes laminated steel plates and coils, those being arranged inside the flywheel, is fixed to the side of the engine 101. The outside of the flywheel 102 is surrounded by a crankcase 107.

In reverse taper mounting of FIG. 18, a bowl-like flywheel 102 is arranged so as to direct the ceiling section of the flywheel 102 toward an engine 101 and a boss 104 of the flywheel 102 is connected to a rotation axis (output shaft) 103 of the engine. Similarly to the positive taper mounting of FIG. 17, a plurality of permanent magnets 105 are fixed to the inner circumferential side of a cylindrical section 102a of the flywheel 102. Further, a stator 106 that faces the permanent magnets 105 is fixed to a crankcase 107 on the other side of the engine 101 so as to be arranged inside the flywheel.

Meanwhile, a fastening method of a boss may also be a spline or flange type although they are not shown in the figures, in addition to a taper.

In any way, in FIGS. 17 and 18, the outside of a flywheel 102 is surrounded by a crankcase 107 and a space between the rotating flywheel 102 and the inner wall of the crankcase 107 is set very small.

Conventional ACGs are shown in FIGS. 19 to 21. A flywheel 102: includes a cylindrical section 102a, a shoulder section 102b, and a ceiling section 102c; and is manufactured by drawing, cutting, or forging a metal (iron or cast metal). A tapered hole 104a through which a rotation axis 103 of an engine passes is formed in the center of a boss 104. A tapered section of the rotation axis 103 of the engine passes through the tapered hole 104a, the flywheel 102 is attached to the rotation axis 103 by fastening the tip of the rotation axis that has passed through the boss 104 with nuts screwed to thread parts not shown in the figures, and thus the flywheel 102 is rotationally driven by the rotation of the rotation axis 103 (refer to Patent Literatures 1 and 2).

A desired inertia moment (hereunder referred to as inertia) is required for reducing the rotation pulsation of an engine as a main function of a flywheel 102. In recent years, while a low fuel consumption of a vehicle is sought, it is important to reduce the mass of a flywheel and try to improve a fuel consumption. A conventional flywheel, however, includes a boss, a ceiling section, and a cylindrical section, all of which are made of a metal (iron), and hence the mass of a generator is large.

An inertia moment I is proportional to the square of a radius r and hence a cylindrical section can earn an inertia dominantly and effectively ($I = mr^2$). By adopting a resin as a material for a ceiling section having a small inertia per mass, therefore, it is possible to reduce the weight efficiently while the inertia is ensured by the cylindrical section.

FIG. 19 shows a state of attaching a conventional ACG to an engine 101 by positive taper mounting. A flywheel 102 is rotationally driven by the rotation of a rotation axis 103 and AC voltage is generated in coils 106a of a stator 106 by the change of a magnetic flux of permanent magnets 105 rotating together.

CITATION LIST

Patent Literature

PTL 1: Japanese Unexamined Patent Application Publication No. Hei 10-225033
PTL 2: Japanese Unexamined Patent Application Publication No. 2007-129818

SUMMARY OF INVENTION

Technical Problem

As stated above, a flywheel 102: is incorporated in a narrow space of bad heat dissipation such as a crankcase; is likely to receive engine heat of a high temperature through a metal rotation axis 103; and is always in the state of a high temperature. Further, a centrifugal force acts always on the rotating flywheel 102. Furthermore, the flywheel 102 is in the state of being likely to generate abnormal vibration or abnormal impact during travel on an off-road such as a mountain road.

If a severe vibration or impact is applied to a flywheel 102 on which a centrifugal force acts by rotation in a high temperature state in this way, a crack may develop undesirably between a boss 104 and a ceiling section 102c of the flywheel. Then if rotation continues in the state of developing a crack, breakage may occur undesirably between the boss 104 and the ceiling section 102c at the worst.

FIG. 22 shows the state of such breakage and the reference sign 108 represents a break portion between a vicinity of a boss 104 and a ceiling section 102c. In this state, the ceiling section 102c and a cylindrical section 102a of a flywheel which have lost an axis center adhere to a stator 106 and are fixed in the state of inclining with respect to a rotation axis 103 by the magnetic force of permanent magnets 105 attached to the rear surface.

Since there is no space where a broken cylindrical section 102a can escape safely in a crankcase as stated earlier, however, the frequency at which a rotating boss 104 and a stopping ceiling section 102c of a flywheel touch each other increases. When the frequency of the contact increases, frictional heat is generated between them and they may start melting undesirably if the frictional heat exceeds the melting point of iron (about 1,500° C., refer to FIG. 12).

Meanwhile, power generation failure caused by the stop of a cylindrical section 102a by breakage or detection failure of a rotation angle of a rotation axis 103 happens and hence the rotation of an engine reduces. In accordance with this, a frictional heat temperature of a boss 104 and a ceiling section 202c of a flywheel lowers and, when the temperature lowers to the melting point of iron or lower, the contact portions of the boss 104 and the ceiling section 102c are integrated and solidify.

On this occasion, the ceiling section 102c and the cylindrical section 102a of the flywheel: stick obliquely to the stator 106 fixed to a vehicle; hence bite each other; and are in a fixed and locked state. When the contact portions of the boss 104 and the ceiling section 102c are integrated and solidify, therefore, the rotation axis 103, together with the boss 104, may also be locked and an engine may be locked in a rotation region (about 6,000 rpm, refer to FIG. 15) undesirably. This phenomenon appears also in an ACG of reverse taper mounting likewise.

In view of the above conventional problem, an object of the present invention is to provide a magnet generator that can reduce a mass without reducing a desired inertia and can prevent an engine from being locked by vibration or impact in a high rotation speed region.

Solution to Problem

The present invention is, in order to solve the above problem, characterized in that, in a magnet generator including a rotor including a bowl-like flywheel having a cylindrical section and a ceiling section, a plurality of permanent magnets arranged over the inner circumferential wall surface of the cylindrical section, and a boss arranged in the center of the ceiling section and attached to an output shaft of a prime mover, and a stator facing the permanent magnets, fixed to the prime mover side inside the flywheel and including iron cores and coils, wherein at least a part of the ceiling section of the flywheel is formed of a synthetic resin and the remaining part is formed of a metal.

Further, in the above configurations, in the flywheel, a part of the ceiling section on the outer circumferential side of the boss may be formed of a synthetic resin and the remaining part may be formed of a metal.

In general, as an engine speed increases, the speed of a vehicle increases and a kinetic energy also increases. When an engine is locked during rotation, therefore, an impact given to a vehicle is large. Further, when a vehicle is locked in the state of increasing the speed of the vehicle, operation of the vehicle becomes impossible and that may possibly lead to a serious accident. At a low speed inversely, the same is less likely.

By the aforementioned configuration according to the claimed invention, since the melting and solidification of a synthetic resin having an impact resistance lower than a metal occur in a low rotation region in a flywheel, safety is secured even when an engine is locked.

Further, when a thermosetting synthetic resin is used as a synthetic resin, breakage occurs at a predetermined temperature or higher but remelting does not occur even when the temperature lowers, hence solidification does not occur, an engine is not locked, and thus safety is further enhanced.

Furthermore: in the flywheel, the ceiling section may include a ceiling section formed of a synthetic resin and a metal-made ceiling section formed integrally with the boss and the cylindrical section; in the flywheel, the metal-made ceiling section may include at least one spoke connecting the boss and the cylindrical section; and, in the flywheel, the metal-made ceiling section may include a thin plate connecting the boss and the cylindrical section.

By those configurations, it is possible to center the axes of a boss and a cylindrical section and simultaneously enhance the strength of a ceiling section.

Moreover, in the above configurations: in the flywheel, the ceiling section and a part of the cylindrical section ranging to the ceiling section may be formed of a synthetic resin and the remaining part of the cylindrical section may be formed of a metal; a boundary between the synthetic resin and the metal of the cylindrical section of the flywheel may be located in the vicinity of the end face of the permanent magnets on the ceiling section side of the flywheel; and the synthetic resin and the metal of the flywheel may adhere to each other with an adhesive.

By those configurations: since a part of the ceiling section having a small inertia per mass is formed of a resin, a necessary inertia is ensured while the whole flywheel is lightened; and since the ceiling section of the flywheel is formed of a synthetic resin, it is possible to reduce the magnetic flux leakage of the permanent magnets through the ceiling section, prevent decrease in efficiency, and adhere the synthetic resin and the metal easily to each other with an adhesive.

In addition, in the above configurations: the flywheel may be formed of a synthetic resin covering the ceiling and the cylindrical section and may have a cylindrical yoke formed by arranging a magnetic body along the outer circumferential surface of the permanent magnets; the permanent magnets, the boss, the yoke, and a magnet cover may be embedded into a synthetic resin and fixed to the flywheel; and the permanent magnets may be embedded into the synthetic resin so that the end faces of the permanent magnets may be exposed from the synthetic resin.

By those configurations: the waterproofness of the permanent magnets, the boss, and the yoke improves and the magnetic flux leakage of the permanent magnets through the ceiling section can be reduced while the whole flywheel is lightened; and, since the whole flywheel is formed of a resin, the flywheel itself does not rust and the rust prevention effect of the stator covered with the flywheel can be obtained. Further, since the magnetic path starting from the outer circumferential surface of the permanent magnets and reaching the inner circumferential surface of the permanent magnets via the ceiling section is formed of a synthetic resin, the magnetic resistance of the magnetic path becomes extremely large, the leakage of the magnetic flux can be reduced, and the efficiency does not deteriorate.

Additionally, in the above configurations, the present invention is characterized in that the yoke is set so as to have a mass that gives a predetermined inertia to the flywheel. By this configuration, a predetermined inertia can be maintained by adjusting the mass by the yoke while the whole flywheel is lightened.

Yet further, in the above configurations, the synthetic resin may be a thermosetting synthetic resin, a thermoplastic non-crystalline resin, or a thermoplastic crystalline resin having a melting point of 800° C. or lower.

By those configurations, although a thermosetting synthetic resin is broken at a predetermined temperature or higher, the thermosetting synthetic resin does not remelt even when the temperature lowers, hence solidification does not occur, an engine is not locked, and hence the thermosetting synthetic resin is safer. In a thermoplastic resin, resolidification occurs by melting after the breakage of the flywheel in a low rotation region and hence, even when an engine is locked, the engine is locked in the low rotation region, hence impact given to a vehicle is small, and impact on a driver is also small.

Still further, in the above configurations, the synthetic resin may be a non-flammable, flame-retardant, or self-extinguishing resin and may contain a fibrous material. By this configuration, it is possible to: prevent a vehicle fire; and make the device not broken easily by impact on a vehicle by enhancing the strength of the resin.

Advantageous Effects of Invention

According to the present invention, since a part of a ceiling section having a small inertia per mass is formed of a resin, it is possible to: reduce a mass without the reduction of a desired inertia; and prevent an engine from being locked in a high rotation speed region.

BRIEF DESCRIPTION OF DRAWINGS

FIG. 14 is a sectional side view of a flywheel according to Example 5 of the present invention.

FIG. 15 is an explanatory view showing a relationship among a rotation speed of an engine, a friction temperature, and a melting temperature.

FIG. 16 is an explanatory view showing physical properties of iron and resin.

DESCRIPTION OF EMBODIMENTS

Specific examples according to the present invention are explained hereunder in reference to FIGS. 1 to 14. In each of the figures, a part represented by an identical reference sign indicates an identical or corresponding part.

EXAMPLE 1

Figure 1:
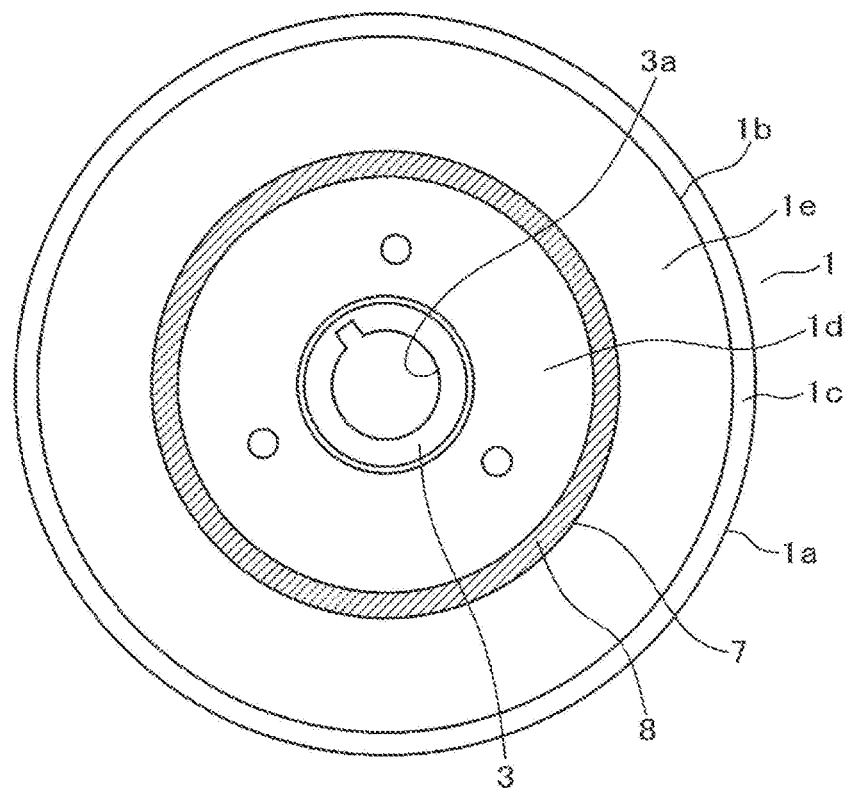
FIG. 1 is a plan view of a flywheel according to Example 1 of the present invention.
Figure 2:
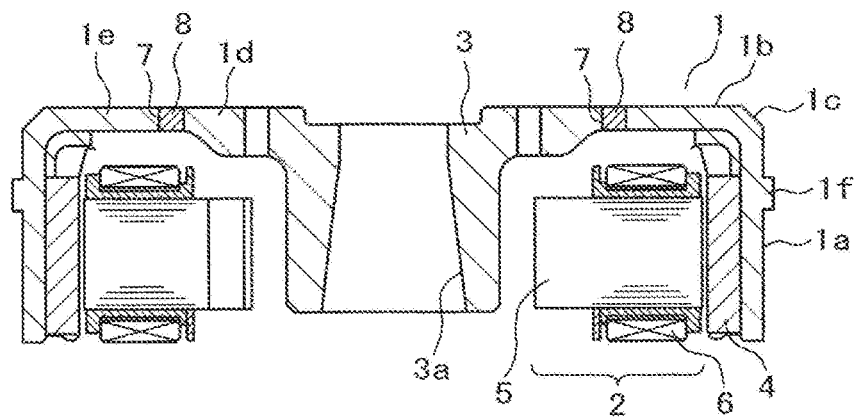
FIG. 2 is a sectional side view of a flywheel according to Example 1 of the present invention.

FIG. 1 is a plan view of a flywheel according to Example 1 of the present invention, FIG. 2 is a sectional side view of the flywheel according to Example 1 likewise, and the figures show a state of arranging a stator in the interior of the flywheel. In FIGS. 1 and 2, an engine (prime mover) of a vehicle and its output shaft are omitted.

The reference sign 1 represents a bowl-like flywheel and the flywheel: includes a tube-like cylindrical section 1a, a disk-like ceiling section 1b, and a shoulder section 1c connecting those two sections; and is formed by drawing a metal (iron) or the like. The reference sign 3 represents a boss formed in the center of the ceiling section 1b and a tapered hole 3a to pass through a rotation axis (output shaft) of an engine is formed.

A tapered section of the output shaft of the engine (not shown in the figures) is inserted into the tapered hole 3a of the boss, the tip of the output shaft is attached to the boss 3 (or the flywheel 1) by a threaded portion not shown in the figures, and the flywheel 1 rotates together with the rotation of the output shaft.

The reference sign 4 represents a plurality of permanent magnets fixed to and along the inner circumferential surface of the cylindrical section 1a. The reference sign 2 represents a stator arranged on the inner circumferential side of the flywheel 1 and the stator includes laminated steel plates 5 facing the permanent magnets 4 and coils 6 wound around the laminated steel plates. The stator 2 is fixed to the engine side in a stationary state so that the lamination planes of the laminated steel plates 5 may face the permanent magnets with a slight gap interposed. An AC voltage is generated in the coils 6 through electromagnetic induction action by rotating the permanent magnets 4 together with the flywheel 1 around the stator 2.

A cylindrical yoke of a magnetic body is considered to be necessary on the back of the permanent magnets 4 in order to form magnetic paths between adjacent permanent magnets 4. In Example 1, the cylindrical section 1a is a magnetic body (iron-made), forms magnetic paths, and hence is used also as the yoke.

The reference sign 8 represents a thermoplastic crystalline synthetic resin having a melting point of 800° C. or lower and the synthetic resin is formed in the ceiling section 1b of the flywheel 1 annularly around the boss 3. The annular synthetic resin 8 is arranged by fitting and being fixed to an annular hole 7 (around the boss 3) separating the ceiling section 1b into an inner circumferential section 1d and an outer circumferential section 1e.

The synthetic resin 8 is fixed to the annular hole 7: either by applying a heat-resistant adhesive or the like to the annular hole 7 and binding them; or by arranging the inner circumferential section 1d and the outer circumferential section 1e of the ceiling section 1b in a mold in the state of forming the annular hole 7, pouring a resin into the annular hole 7, and solidifying the resin. The work is facilitated in the case of an adhesive.

In this way, in the flywheel 1, a part of the metal-made ceiling section 1b is formed of the annular synthetic resin 8 and the remaining part (the inner circumferential section 1d and the outer circumferential section 1e) is formed of a metal. The reference sign 1f represents metal-made protruding reluctors arranged around the outer circumference of the cylindrical section 1a at certain intervals in the circumferential direction, the positions of the reluctors are detected with a power generation element (not shown in the figures) arranged closely, and the rotation speed of the flywheel 1 and the like are detected with the signal.

The flywheel 1 configured in this way: rotates together with an output shaft of an engine; and reduces the rotation pulsation of the engine by using the inertia. On this occasion, a part contributing mainly to the inertia of the flywheel 1 is the cylindrical section 1a including the permanent magnets 4 distant from the center. In Example 1, an inertia is dominated by the mass of the cylindrical section 1a including the permanent magnets 4 and iron.

Next, it is assumed that a severe vibration or impact is given to a flywheel 1 rotating together with the rotation of an output shaft of an engine, cracks develop in the flywheel 1, and then breakage is caused between a boss 3 and a ceiling section 1b.

In Example 1, the mechanically weakest part in a flywheel 1 is the part of an annular synthetic resin 8 formed at a part of a ceiling section 1b. When a severe vibration or impact is given to a vehicle, therefore, force concentrates on the synthetic resin 8 of the ceiling section in the flywheel 1, cracks develop, and then breakage is caused.

When breakage is caused at a part of a synthetic resin 8, an outer circumferential section 1e of a ceiling section 1b and a cylindrical section 1a in a flywheel 1: lose an axis center; stick to the side of laminated steel plates 5 in a stator 2 by the magnetic force of permanent magnets 4; and stop in the state of inclining with respect to an output shaft (not shown in the figure).

Meanwhile, since an inner circumferential section 1d of a ceiling section 1b continues to rotate together with a boss 3, parts of a synthetic resin or a resin and a metal touch each other and slide at a break portion of the synthetic resin 8 that is a boundary between the rotating inner circumferential section 1d and a stopping outer circumferential section 1e. Frictional heat is generated on both the sides by the slide and the synthetic resin starts melting when a frictional heat temperature exceeds the melting point (about 300° C.) of the synthetic resin 8.

Meanwhile, by the stop of the outer circumferential section 1e of the ceiling section 1b in the flywheel 1, power generation failure or detection failure of rotation by reluctors 1f happens and hence the rotation speed of an engine lowers. When the rotation speed of the engine lowers, the frictional heat temperature of the synthetic resin lowers and, when the temperature lowers to the melting point of the synthetic resin or lower, the contact parts of the synthetic resin resolidify and the parts of the synthetic resin or the resin and the metal are integrated.

On this occasion, the outer circumferential section 1e of the ceiling section 1b and the cylindrical section 1a in the flywheel 1 stick obliquely to the stator 2 fixed to a vehicle, bite each other, and are in a locked state. By the synthetic resin 8 of the ceiling section 1b resolidifying and being integrated, therefore, an output shaft fixed to a boss 3 may also be locked and an engine may be locked undesirably.

The melting point of the synthetic resin 8, however, is considerably lower than the melting point of iron and hence the synthetic resin 8 does not resolidify unless the rotation speed of the engine lowers considerably. Even though the synthetic resin solidifies and the engine is locked, therefore, the engine rotation speed is low at the time, a vehicle is also in a low speed state, hence impact given to the vehicle is small, and hence impact on a driver is also small.

Further, the synthetic resin 8 may preferably be a non-flammable, flame-retardant, or self-extinguishing resin in order to prevent a fire accident caused by frictional heat.

Furthermore, the synthetic resin 8 may contain a fibrous material. Tensile, bending, and twisting forces are added to a flywheel by a vibration, a centrifugal load, and the like. The strength of a resin is lower than the strength of a metal and lowers particularly at a high temperature. If the strength of the resin is tried to be increased to the same level as a metal, the resin has to be thickened, a wind noise may be generated sometimes if the resin part thickens, hence the distance from a stator has to be increased, and the physique of a generator increases. For preventing those, a resin strength can be enhanced by mixing a fibrous material (glass or glass fiber) to a resin.

FIG. 15 is an explanatory view showing a relationship among a rotation speed of an engine, a friction temperature, and a melting temperature according to the example of the present invention. The melting temperature of iron is about 1,500° C. and the engine rotation speed at the time is 6,000 rpm. In contrast, the melting temperature of a crystalline synthetic resin is about 300° C., the engine rotation speed at the time is 1,000 rpm, and the vehicle speed is sufficiently low and is a safe speed.

Meanwhile, the reason why a resin having a melting point of 800° C. or lower is used as a thermoplastic synthetic resin 8 is as follows. In general, a flywheel is formed of iron or aluminum and the melting point of aluminum is as low as about 800° C. In the explanatory view of FIG. 15, the engine rotation speed at the melting point of aluminum is 4,000 rpm and a vehicle speed becomes a safer speed as long as the engine rotation speed is lower than the speed. When a resin is used in a flywheel, therefore, a resin having a melting point of 800° C. or lower, which is lower than the melting point of aluminum, has to be selected.

Actually, since the melting point of a synthetic resin is considerably lower than the melting point of aluminum, the synthetic resin does not resolidify unless the number of revolutions of an engine lowers considerably. Even when a synthetic resin solidifies and an engine is locked, therefore, the number of revolutions of the engine at the time is low, the vehicle is also in a low speed state, hence impact given to the vehicle is small, and hence the impact on a driver is also small.

The explanatory view of friction coefficients and heat transfer rates of iron and a resin is shown in FIG. 16. As it is obvious from the figure, since the friction coefficient of a synthetic resin is large, frictional heat between parts of a synthetic resin or between a resin and a metal is larger than frictional heat between a metal and a metal. Contact surfaces of parts of a synthetic resin or a resin and a metal therefore are likely to generate heat intensively at a small rotation (slide) in comparison with friction surfaces of a metal and a metal and further, after melting, the synthetic resin hardly resolidifies unless the rotation speed lowers sufficiently. Even when an engine is locked, therefore, an engine rotation speed at the time is extremely low and hence impact on a driver is also small.

Further, as shown in FIG. 16, since the heat transfer rate of a synthetic resin is smaller than the heat transfer rate of iron, when heat from an engine is transferred to a flywheel through a rotation axis and a boss for example, the heat transfer to permanent magnets 4 is intercepted by a synthetic resin 8 and hence decrease in output caused by the heat of the permanent magnets 4 can be inhibited.

Although the above explanations have been made on the basis of the case of using a crystalline thermoplastic resin as a synthetic resin 8, a non-crystalline thermoplastic resin may also be used. A non-crystalline thermoplastic resin: does not have a crystal structure and a melting point; and hence neither melts by frictional heat nor resolidifies even when breakage occurs. Even when the rotation speed of an engine lowers after breakage, therefore, the engine is not concerned to be locked, impact on a driver is also small, and safety is further enhanced.

Further, when a thermosetting resin is used as a synthetic resin 8, even when breakage occurs, the thermosetting resin neither melts by frictional heat nor resolidifies while broken. In the thermosetting resin, therefore, similarly to the non-crystalline thermoplastic resin, even when the rotation speed of an engine lowers after breakage, the engine is not concerned to be locked, impact on a driver is also small, and safety is further enhanced.

Furthermore, although the above explanations have been made on the basis of the case of using an annular resin formed around a boss 3 as a synthetic resin 8, the resin is not necessarily required to have an annular (circular) shape and any resin is acceptable as long as the resin continues over one round.

EXAMPLE 2

Figure 3:
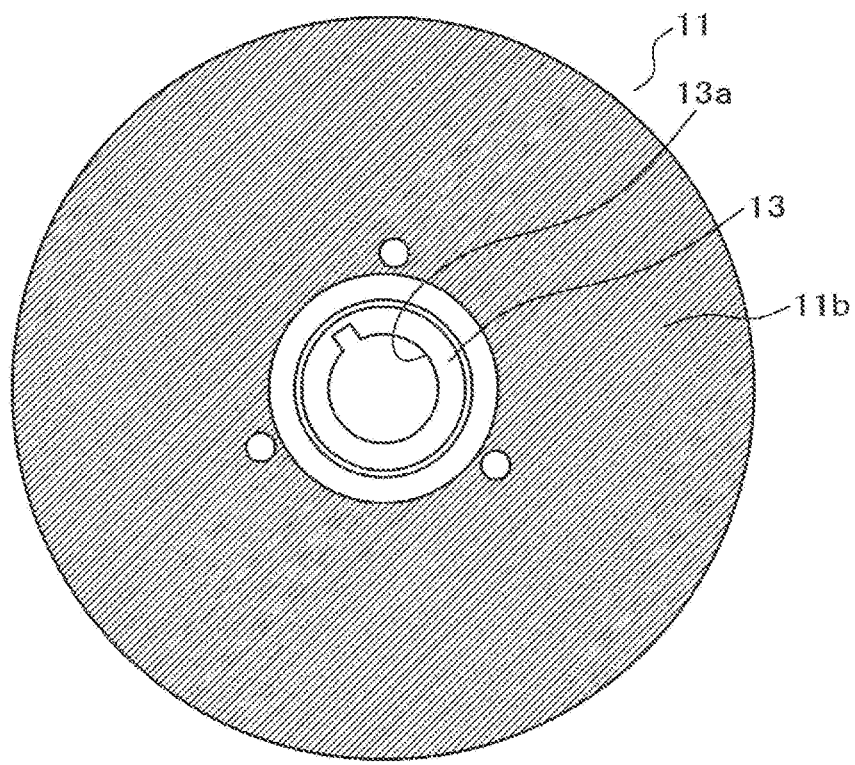
FIG. 3 is a plan view of a flywheel according to Example 2 of the present invention.
Figure 4:
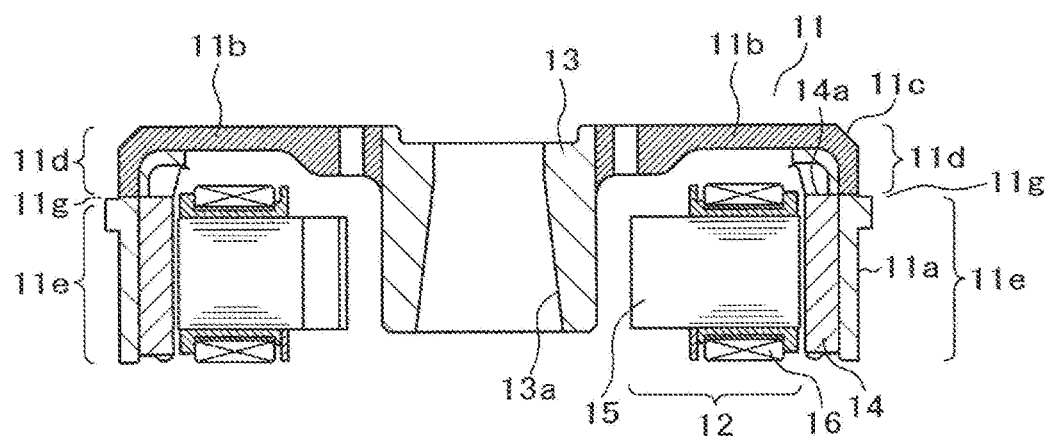
FIG. 4 is a sectional side view of a flywheel according to Example 2 of the present invention.

FIG. 3 is a plan view of a flywheel according to Example 2 of the present invention, FIG. 4 is a sectional side view of the flywheel according to Example 2 likewise, and the figures show a state of arranging a stator in the interior of the flywheel. In FIGS. 3 and 4, an engine of a vehicle and its output shaft are omitted.

The reference sign 11 represents a bowl-like flywheel and the flywheel includes a tube-like cylindrical section 11a, a disk-like ceiling section 11b, and a shoulder section 11c connecting those two sections. The reference sign 13 represents a boss formed in the center of the ceiling section 11b and a tapered hole 13a to pass through an output shaft of an engine not shown in the figures is formed.

A tapered section of the output shaft of the engine (not shown in the figures) is inserted into the tapered hole 13a, the tip of the output shaft is attached to the boss 3 (or the flywheel 1) by a threaded portion not shown in the figures, and the flywheel 11 rotates together with the output shaft.

The reference sign 14 represents a plurality of permanent magnets fixed to and along the inner circumferential surface of the cylindrical section 11a. The reference sign 12 represents a stator arranged on the inner circumferential side of the flywheel 11 and the stator includes laminated steel plates 15 facing the permanent magnets 14 and coils 16 wound around the laminated steel plates. The stator 12 is fixed to the engine side in a stationary state so that the lamination planes of the laminated steel plates may face the permanent magnets with a slight gap interposed. An AC voltage is generated in the coils 16 through electromagnetic induction action by rotating the permanent magnets 14 together with the flywheel 11 around the stator 12.

In Example 2, a ceiling section 11b, a shoulder section 11c, and a part 11d of a cylindrical section 11a ranging from the shoulder section 11c are formed integrally of the same crystalline thermoplastic synthetic resin as Example 1. Then the remaining part 11e (on the side opposite to the ceiling section) of the cylindrical section 11a and a boss 13 are formed of a metal (iron).

The synthetic resin part and the metal part may be formed: either by adhering them with an adhesive; or by arranging the boss 13 and the remaining part 11e of the cylindrical section 11a in a mold (not shown in the figures), pouring a synthetic resin through injection molding, and thus fixing the ceiling section 11b, the shoulder section 11c, and the part 11d of the cylindrical section through integrated molding.

A cylindrical yoke of a magnetic body is considered to be necessary on the back of the permanent magnets 14 in order to form magnetic paths between permanent magnets 14 adjacent to each other in the circumferential direction in the cylindrical section 11a. In Example 2, the iron-made remaining part 11e (on the side opposite to the ceiling section), which is a magnetic body, of the cylindrical section 11a forms magnetic paths between the permanent magnets and hence is used also as the yoke.

A boundary 11g between the part 11d and the remaining part 11e (on the side opposite to the ceiling section) of the cylindrical section is configured so as to be located in the vicinity of the end face 14a of the permanent magnets 14 on the ceiling section 11b side in the flywheel 11. By this configuration, since the ceiling section 11b ranging from the top end of the permanent magnets 14 is formed of a synthetic resin, magnetic paths from the outer circumferential surface (on the cylindrical section 11a side) of the permanent magnets 14 to the inner circumferential surface (on the stator 12 side) of the permanent magnets 14 through the ceiling section 11b (refer to the magnetic path 24b in FIG. 7 that will be described later) include the synthetic resin. The magnetic resistance of the magnetic paths therefore is larger than that of a metal and the leakage of a magnetic flux can be reduced.

The flywheel 11 configured in this way rotates together with an output shaft of an engine and reduces the rotation pulsation of the engine by using the inertia. On this occasion, the part necessary for the inertia of the flywheel 11 is the remaining part 11e of the cylindrical section including the permanent magnets 14 having a large mass. In Example 2, a necessary inertia is set by the mass of the remaining part 11e of the cylindrical section including the permanent magnets 14 and iron.

Next, it is assumed that a severe vibration or impact is given to a flywheel 11 rotating together with an engine, cracks develop in the flywheel, further the rotation continues in the state of developing the cracks, and breakage is caused between both sections.

In Example 2, the mechanically weakest part in a flywheel 11 is the part formed of a synthetic resin. When a severe vibration or impact is given, therefore, force concentrates at the part of the synthetic resin ranging from the ceiling section 11b to the part 11d of the cylindrical section in the flywheel 11, cracks develop at any part of the synthetic resin, and then breakage is caused.

Assuming that breakage occurs at a part of the synthetic resin of the ceiling section 11b of the flywheel 11, the outer circumferential section of a broken part of the ceiling section 11b of the flywheel 11 loses the axis center and, by the magnetic force of the permanent magnets 14, the synthetic resin of the outer circumferential section of the broken part of the ceiling section 11b, the synthetic resin of the shoulder section 11c, and the synthetic resin of the part 11d of the cylindrical section adhere to the side of the laminated steel plates 15 of the stator 12, incline with respect to the output shaft, and are fixed in a stopped state.

Meanwhile, since the inner circumferential section (synthetic resin) of the broken part of the ceiling section 11b and the metal-made boss 13 continue to rotate together, parts of the synthetic resin slide while touching each other and frictional heat is generated between the parts of the synthetic resin at the stopping broken part of the ceiling section 11b. Melting starts between the parts of the synthetic resin when the frictional heat exceeds the melting point (about 300° C.) of the synthetic resin 8.

Meanwhile, by the stop of the permanent magnets 14 of the flywheel 11 due to the breakage, power generation failure or detection failure of rotation by reluctors happens and hence the rotation of an engine lowers. When the rotation of an engine lowers, the frictional heat temperature between the melting synthetic resin parts lowers and, when the frictional heat temperature becomes the melting point of the synthetic resin 8 or lower, contact parts of the synthetic resin resolidify and are integrated.

On this occasion, the outer circumferential section of the ceiling section 11b and the cylindrical section 11a in the flywheel stick obliquely to the stator 12 fixed to a vehicle, bite each other, and are in a locked state. By the synthetic resin of the ceiling section 11b resolidifying and being integrated, therefore, an output shaft fixed to the boss 13 and not shown in the figure may also be locked and an engine may be locked undesirably.

From FIG. 15 as stated earlier, however, the melting temperature of iron is about 1,500° C. and the engine rotation speed at the time is 6,000 rpm. In contrast, the melting temperature of a crystalline synthetic resin is about 300° C. and, even when an engine is locked, the engine rotation speed is 1,000 rpm, hence impact given to a vehicle is small, and impact on a driver is also small.

Further, similarly to Example 1, from the friction coefficients of iron and resin shown in FIG. 16, since the friction coefficient of a synthetic resin is large, heat is likely to be generated significantly by small rotation (sliding) between parts of the synthetic resin and the synthetic resin hardly resolidifies unless the rotation speed lowers sufficiently after melting. Even when an engine is locked, therefore, the engine rotation speed at the time is extremely low, hence impact given to a vehicle is small, and impact on a driver is also small.

Furthermore, similarly to Example 1, as shown in FIG. 16, since the heat transfer rate of a synthetic resin is smaller than that of iron, when heat from an engine is transferred to the flywheel through the rotation axis and the boss for example, the heat transfer to the permanent magnets 14 is interrupted by the synthetic resin and hence the permanent magnets 14 can be inhibited from deteriorating by heat.

Moreover, similarly to Example 1, when a non-crystalline thermoplastic resin is used as the synthetic resin, the non-crystalline thermoplastic resin does not have a crystal structure and a melting point and hence neither melts by frictional heat nor resolidifies even when breakage occurs. Even when the rotation speed of an engine lowers after breakage, therefore, the engine is not concerned to be locked.

In addition, when a thermosetting resin is used, even when breakage occurs similarly to the above case, the thermosetting resin neither melts by frictional heat nor resolidifies. In the thermosetting resin, therefore, similarly to the non-crystalline thermoplastic resin, even when the rotation speed of an engine lowers after breakage, the engine is not concerned to be locked, and safety is further enhanced.

EXAMPLE 3

Figure 5:
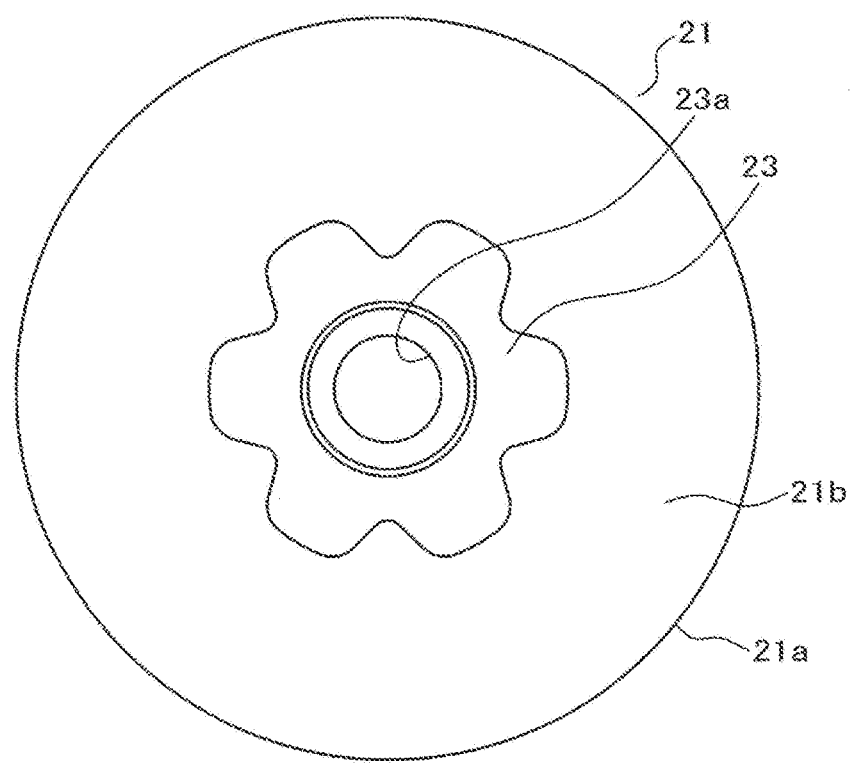
FIG. 5 is a plan view of a flywheel according to Example 3 of the present invention.
Figure 6:
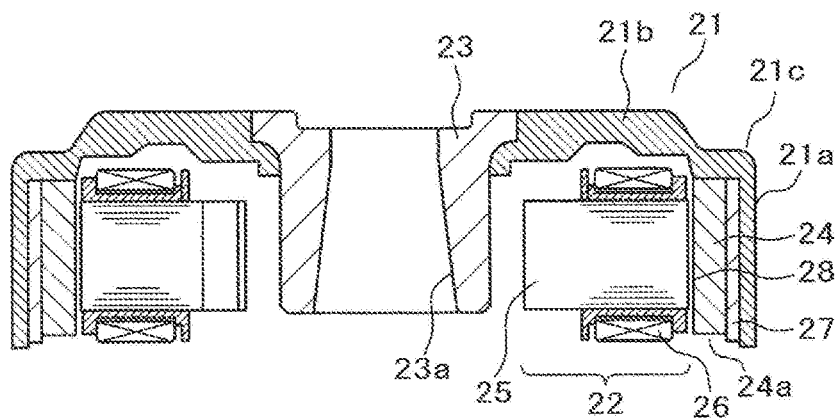
FIG. 6 is a sectional side view of a flywheel according to Example 3 of the present invention.

FIG. 5 is a plan view of a flywheel according to Example 3 of the present invention, FIG. 6 is a sectional side view of the flywheel according to Example 3 likewise, and the figures show a state of arranging a stator in the interior of the flywheel. In FIGS. 5 and 6, an engine of a vehicle and its output shaft are omitted.

The reference sign 21 represents a bowl-like flywheel and the flywheel includes a tube-like cylindrical section 21a, a disk-like ceiling section 21b, and a shoulder section 21c connecting those two sections. The reference sign 23 represents a boss formed in the center of the ceiling section 21b and a tapered hole 23a to pass through an output shaft of an engine not shown in the figures is formed.

A tapered section of the output shaft of the engine (not shown in the figures) is inserted into the tapered hole 23a, the tip of the output shaft is attached to the boss 3 (or the flywheel 1) by a threaded portion not shown in the figures, and the flywheel 21 rotates together with the rotation of the output shaft.

The reference sign 24 represents a plurality of permanent magnets fixed to and along the inner circumferential surface of the cylindrical section 1a. The reference sign 22 represents a stator arranged on the inner circumferential side of the flywheel 21 and the stator includes laminated steel plates 25 facing the permanent magnets 24 and coils 26 wound around the laminated steel plates. The stator 22 is fixed to the engine side in a stationary state so that the lamination planes of the laminated steel plates may face the permanent magnets with a slight gap interposed. An AC voltage is generated in the coils 26 through electromagnetic induction action by rotating the permanent magnets 24 together with the flywheel 21 around the stator 22.

In Example 3, the whole flywheel 21 including the cylindrical section 21a, the ceiling section 21b, and the shoulder section 21c is formed integrally of the same crystalline thermoplastic synthetic resin as Example 1. The boss 23 is formed of a metal (iron).

Here, the reference sign 27 represents a yoke including a magnetic body (iron) fixed so as to be interposed between the inner circumferential surface of the cylindrical section 21a and the outer circumferential surface of the permanent magnets. The yoke 27 is formed into a cylindrical shape and forms magnetic paths between adjacent permanent magnets 24. Although the cylindrical section outside the permanent magnets is a magnetic body (iron) and functions as a yoke in Examples 1 and 2, in Example 3, the cylindrical section 21a of the flywheel 21 is formed of a resin and hence the yoke 27 to form magnetic paths between the permanent magnets 24 is required.

The reference sign 28 represents an annular magnet case including a thin metal plate attached to the inner circumferential surface of the permanent magnets 24 and the magnet case aligns and protects the inner circumferential surface of the permanent magnets 24. Here, in Example 1 and 2 too, a magnet case 28 is provided over the inner circumferential surface of the permanent magnets but is not shown in the figures and is not explained.

The components are assembled into the flywheel 21 (synthetic rein) by arranging the permanent magnets 24, the boss 23, the yoke 27, and the magnet case 28 in a mold (not shown in the figures), pouring a synthetic resin into the mold by injection molding, and thus embedding the components into the resin.

In the embedment, since the components are embedded into an opaque synthetic resin, the existence of the components is not seen from appearance. In Example 3, the embedment is applied so that an end face 24a of the permanent magnets 24 may be exposed outside from the synthetic resin. Further, an end face of the yoke 27 may also be exposed outside from the synthetic resin. By configuring the components in this way, the permanent magnets 24 and the yoke 27 can be recognized from the appearance of the flywheel after the embedment.

In Example 3, the whole flywheel 21 is formed of a synthetic resin. As a result, since the ceiling section 21b ranging from the top end of the permanent magnets 24 includes the synthetic resin, the magnetic path 24b (refer to FIG. 7) starting from the outer circumferential surface (on the cylindrical section 21a side) of the permanent magnets 24 and reaching the inner circumferential surface (on the stator 22 side) of the permanent magnets 24 via the ceiling section 21b is formed of the synthetic resin. The magnetic resistance of the magnetic path 24b therefore is extremely large and the leakage of a magnetic flux can be reduced.

Figure 7:
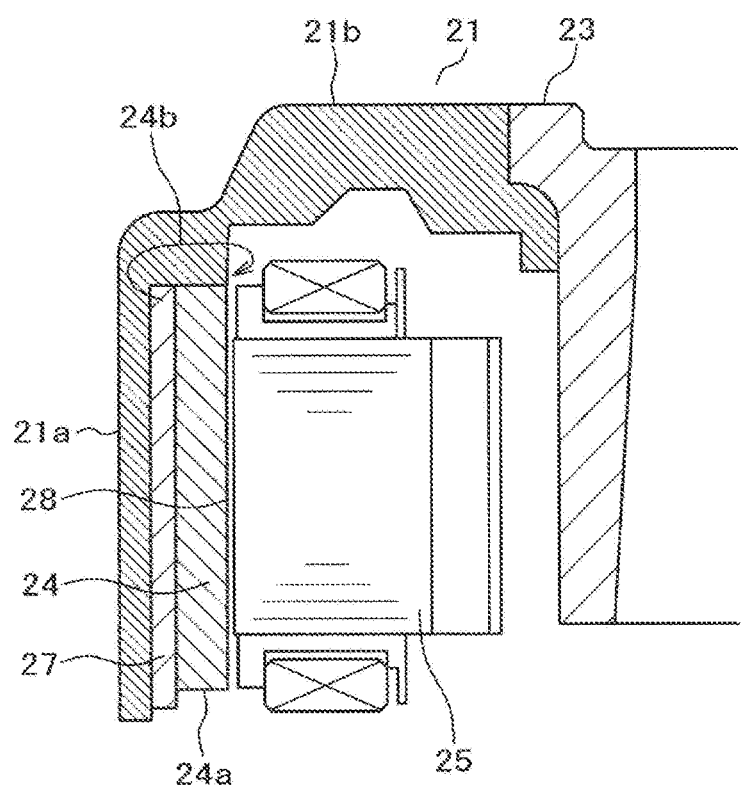
FIG. 7 is a partial explanatory view of a sectional side view of a flywheel according to Example 3 of the present invention.
Figure 8:
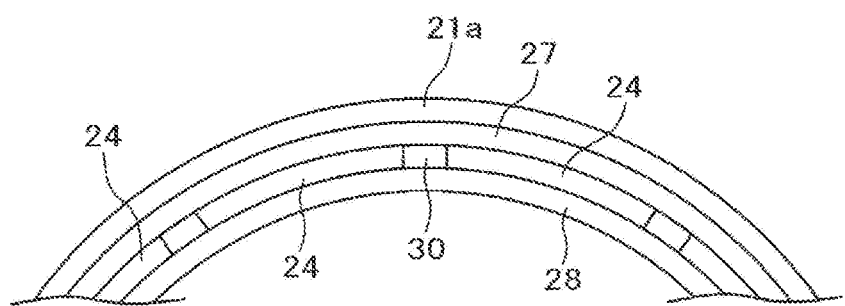
FIG. 8 is an explanatory view of a cross section of a cylindrical section of a flywheel according to Example 3 of the present invention.

FIG. 8 is an explanatory view showing an enlarged part of a cross section of a cylindrical section of a flywheel according to Example 3. The components identical to FIG. 7 are represented by the identical reference signs. A yoke 27 is arranged over the inner circumference of a cylindrical section 21a, multiple permanent magnets 24 are arranged over the inner circumference of the yoke 27 at intervals in the circumferential direction, and a thin magnet case 28 is attached to the inner circumferential surface of the permanent magnets 24. The reference sign 30 represents a synthetic resin layer entering the gaps between the permanent magnets 24.

Figure 9:
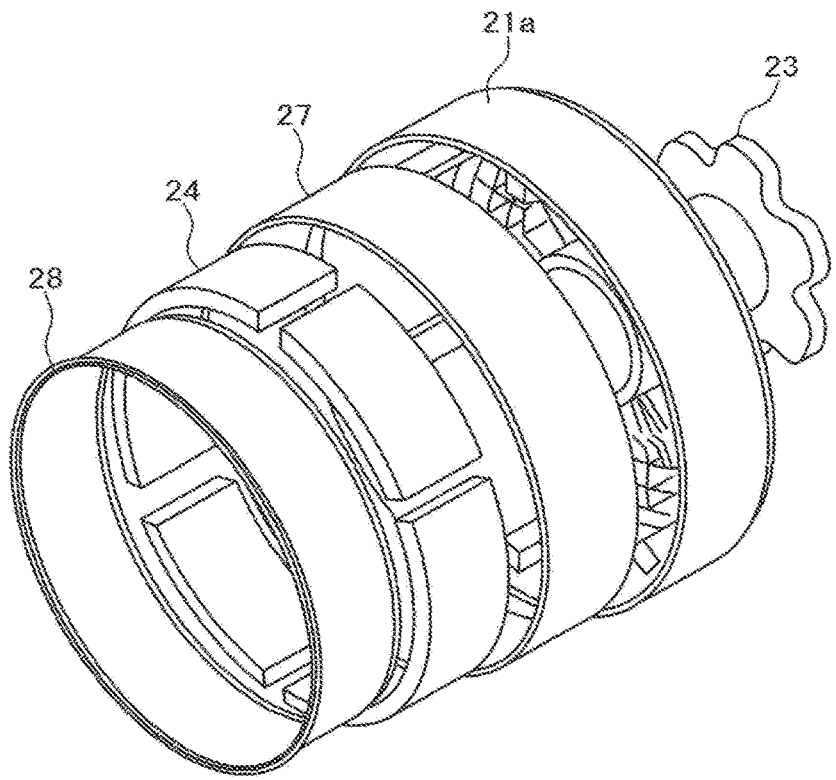
FIG. 9 is an exploded perspective view of a flywheel according to Example 3 of the present invention.

An exploded perspective view of a flywheel according to Example 3 is shown in FIG. 9. A cylindrical section 21a, a boss 23, a yoke 27, permanent magnets 24, and a magnet case 28 are integrally molded by a synthetic resin so as to be arranged in sequence.

Figure 10:
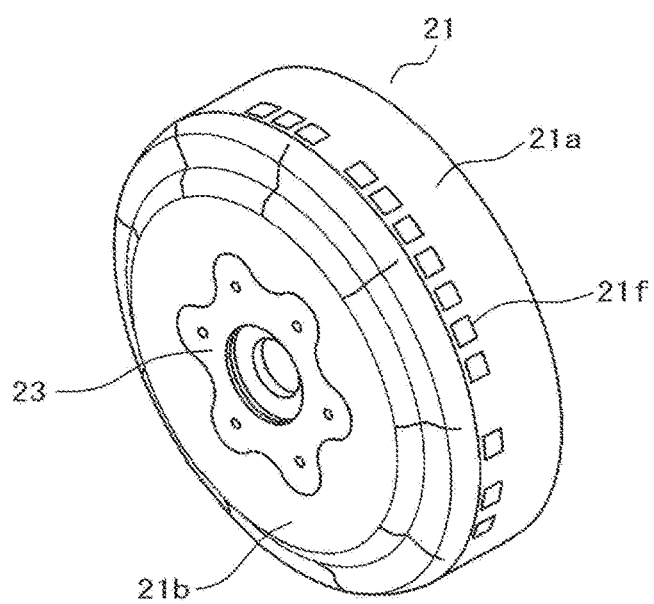
FIG. 10 is a perspective view viewed from the lower side of a flywheel according to Example 3 of the present invention.

A perspective view viewed from a ceiling section 21b side of a flywheel 21 according to Example 3 is shown in FIG. 10. The parts identical to FIGS. 5 to 9 are represented by the identical reference signs. The reference sign 21f represents metal-made protruding reluctors arranged around the outer circumference of a cylindrical section 21a at certain intervals in the circumferential direction, the positions of the reluctors are detected with a power generation element not shown in the figure, and the rotation speed of the flywheel 21 and the like are detected with the signal.

Figure 11:
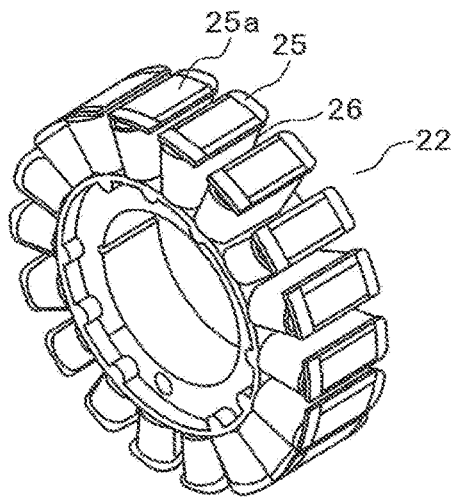
FIG. 11 is a perspective view of a stator according to an example of the present invention.

A perspective view of a stator according to Example 3 is shown in FIG. 11. A stator 22 includes laminated steel plates 25 and coils 26 wound around the outer peripheries of the laminated steel plates. The laminated steel plates 25 are fixed to the engine side in a stationary state so that the lamination planes of the laminated steel plates 25 may face permanent magnets 24 with a slight gap interposed. Then an AC voltage is generated in the coils 26 through electromagnetic induction action by rotating the permanent magnets 24 together with a flywheel 21 around the stator 22. Here, the stator 22 shown in FIG. 11 has the same structure as the stators in Examples 1 and 2.

The flywheel 21 configured in this way rotates together with the rotation of an output shaft of an engine and reduces the rotation pulsation of the engine by using the inertia by the rotation. On this occasion, the parts necessary for the inertia of the flywheel 21 are permanent magnets 24 and a metal-made yoke 27 having large masses. In Example 3, the inertia is adjusted by the mass of the yoke 27 including a magnetic body (iron) and specifically by the thickness and width of the yoke 27.

Next, it is assumed that a severe vibration or impact is given to a flywheel 21 rotating together with an engine, cracks develop in the flywheel, further the rotation continues in the state of developing the cracks, and breakage is caused between both sections.

In Example 3, since a whole flywheel 21 is formed of a synthetic resin, when a severe vibration or impact is given, cracks develop at any part of the synthetic resin, and then breakage is caused.

Assuming that breakage occurs at the ceiling section 21b of the flywheel 21, the flywheel 21 loses the axis center and, by the magnetic force of the permanent magnets 24, the outer circumferential section of the broken part of the ceiling section 21b, the shoulder section 21c, and the cylindrical section 21a adhere to the side of the laminated steel plates 25 of the stator 22, incline with respect to the output shaft, and are fixed in a stopped state.

Meanwhile, since the inner circumferential section (synthetic resin) of the broken part of the ceiling section 21b and the metal-made boss 23 continue to rotate together, parts of the synthetic resin slide while touching each other and frictional heat is generated between the parts of the synthetic resin at the stopping broken part of the ceiling section 21b. Melting starts between the parts of the synthetic resin when the frictional heat exceeds the melting point (about 300° C.) of the synthetic resin 8.

Meanwhile, by the stop of the permanent magnets 24 of the flywheel 21 due to the breakage, power generation failure or detection failure of rotation by reluctors happens and hence the rotation of an engine lowers. When the rotation of an engine lowers, the frictional heat temperature between the melting synthetic resin parts lowers and, when the frictional heat temperature becomes the melting point of the synthetic resin 8 or lower, contact parts of the synthetic resin resolidify and are integrated.

On this occasion, the outer circumferential section of the ceiling section 21b and the cylindrical section 21a in the flywheel stick obliquely to the stator 22 fixed to a vehicle, bite each other, and are in a fixed and locked state. By the parts of the synthetic resin of the ceiling section 21b resolidifying and being integrated, therefore, an output shaft fixed to the boss 23 and not shown in the figure may also be locked and an engine may be locked undesirably.

Since the melting point of a synthetic resin, however, is considerably lower than the melting point of iron as stated above, the synthetic resin does not resolidify unless the rotation speed of an engine lowers. Even when a crystalline synthetic resin solidifies and an engine is locked, therefore, the engine rotation speed at the time is as low as 1,000 rpm, the vehicle is also in a low speed state, impact given to the vehicle is small, and hence impact on a driver is also small.

Further, similarly to Examples 1 and 2, from the friction coefficients of iron and resin shown in FIG. 16, since the friction coefficient of a synthetic resin is large, heat is likely to be generated significantly by small rotation (sliding) between parts of the synthetic resin and the synthetic resin hardly resolidifies unless the rotation speed lowers sufficiently after melting. Even when an engine is locked, therefore, the engine rotation speed at the time is extremely low.

Furthermore, as shown in FIG. 16, since the heat transfer rate of a synthetic resin is smaller than that of iron, when heat from an engine is transferred to the flywheel 21 through the rotation axis and the boss 23 for example, the heat transfer to the permanent magnets 24 is interrupted by the synthetic resin and hence the permanent magnets 24 can be inhibited very effectively from deteriorating by heat.

Moreover, similarly to Examples 1 and 2, when a non-crystalline thermoplastic resin is used as the synthetic resin, the non-crystalline thermoplastic resin does not have a crystal structure and a melting point and hence neither melts by frictional heat nor resolidifies even when breakage occurs. Even when the rotation speed of an engine lowers after breakage, therefore, the engine is not concerned to be locked and hence there is no impact on a driver.

In addition, when a thermosetting resin is used, even when breakage occurs similarly to the above case, the thermosetting resin neither melts by frictional heat nor resolidifies. In the thermosetting resin, therefore, similarly to the non-crystalline thermoplastic resin, even when the rotation speed of an engine lowers after breakage, the engine is not concerned to be locked, hence there is no impact on a driver, and safety is further enhanced.

In Example 3, a ceiling section 21b, a shoulder section 21c, and a cylindrical section 21a in a flywheel include a resin and hence the components never rust.

Although a boss is formed of a metal in Examples 1 to 3, a boss may be formed of a resin as long as a sufficient strength is ensured. Further, the direction of attaching a flywheel to an engine shown in Examples 1 to 3 may be either positive taper mounting or reverse taper mounting.

EXAMPLE 4

Figure 12:
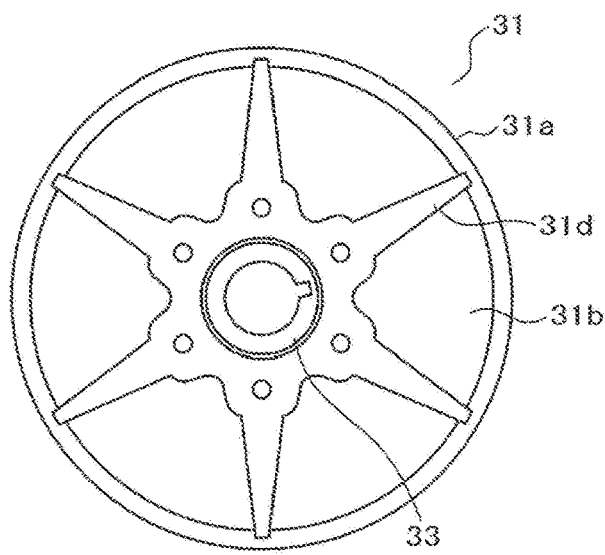
FIG. 12 is a plan view of a flywheel according to Example 4 of the present invention.
Figure 13:
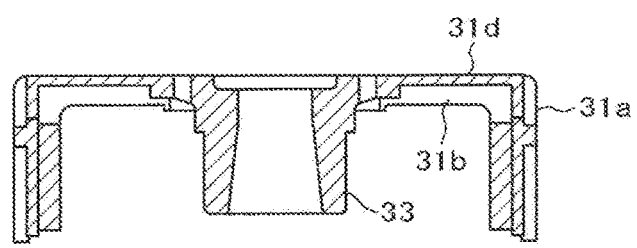
FIG. 13 is a sectional side view of a flywheel according to Example 4 of the present invention.
Figure 17:
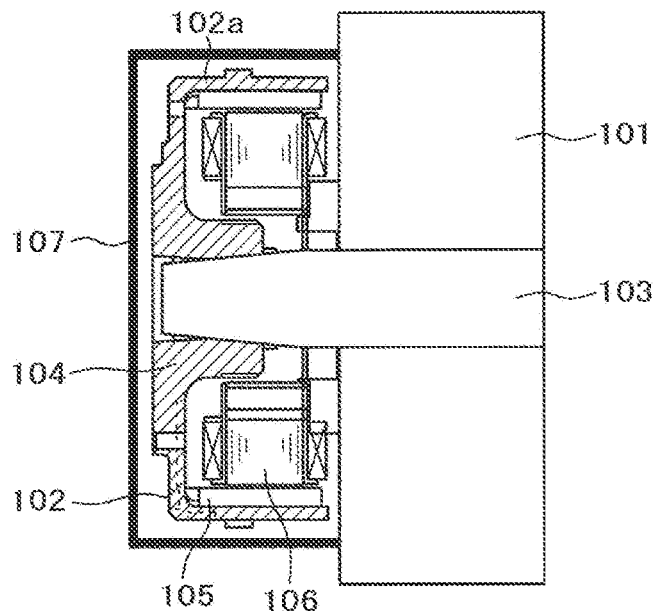
FIG. 17 is an explanatory view of positive taper mounting of a flywheel.
Figure 18:
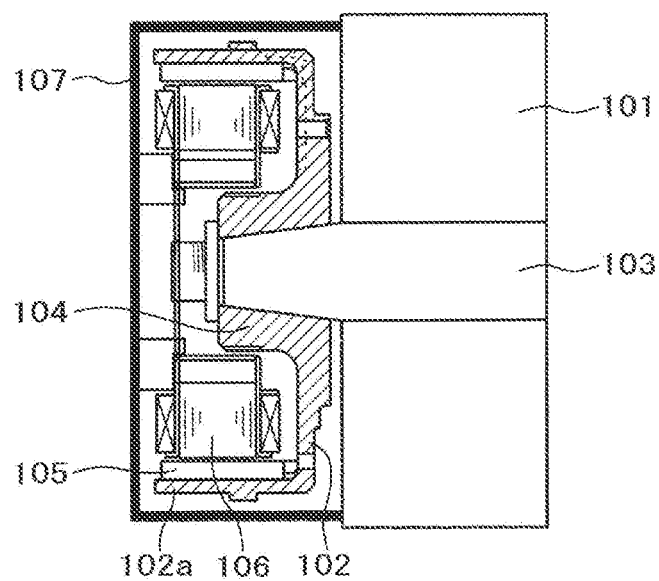
FIG. 18 is an explanatory view of reverse taper mounting of a flywheel.
Figure 19:
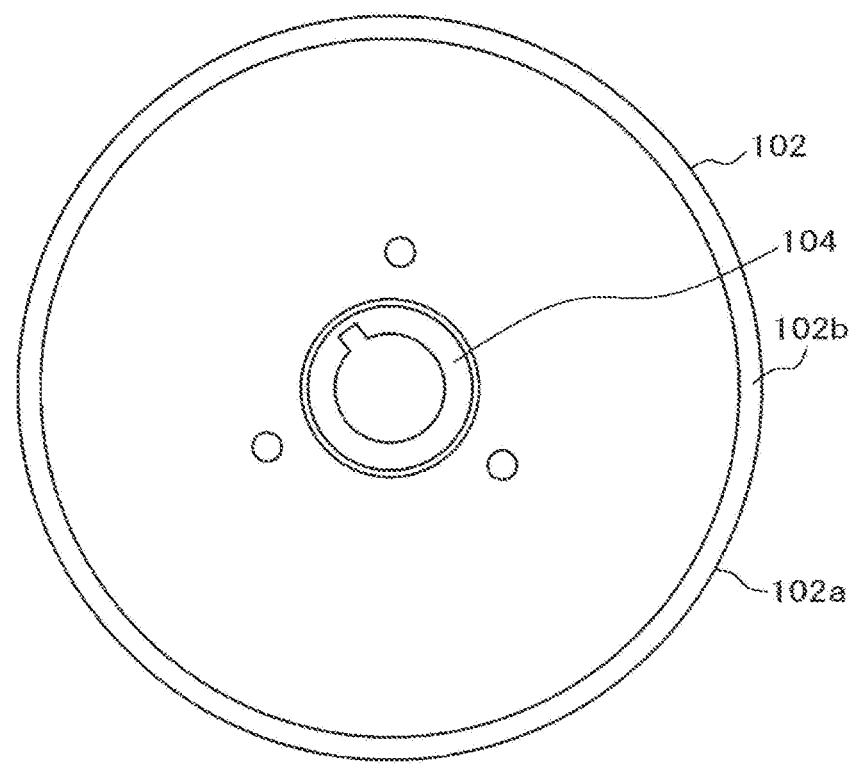
FIG. 19 is a plan view of a flywheel in a conventional ACG.
Figure 20:
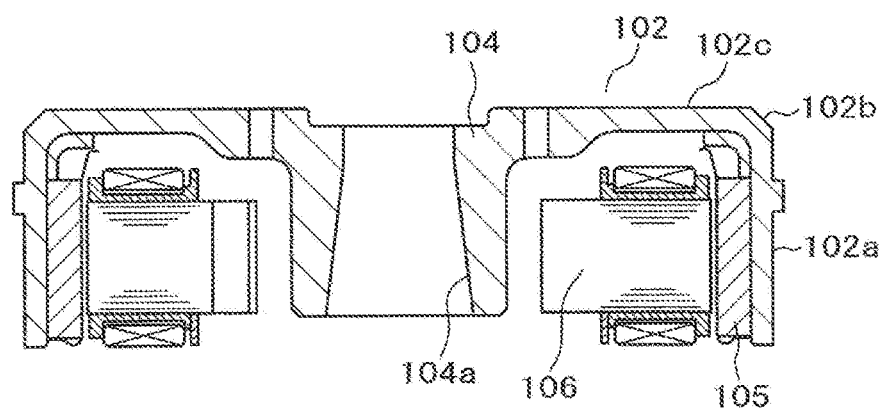
FIG. 20 is a sectional side view of a flywheel in a conventional ACG.
Figure 21:
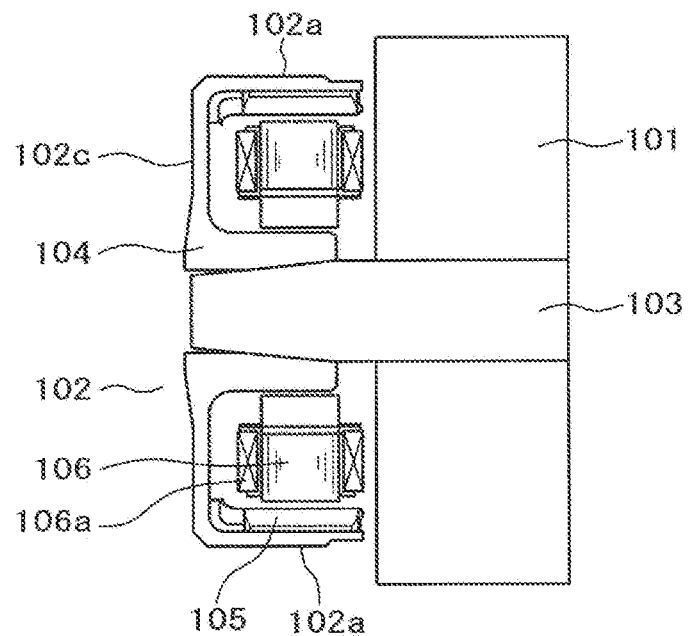
FIG. 21 is an explanatory view of a flywheel before breakage in a conventional ACG.
Figure 22:
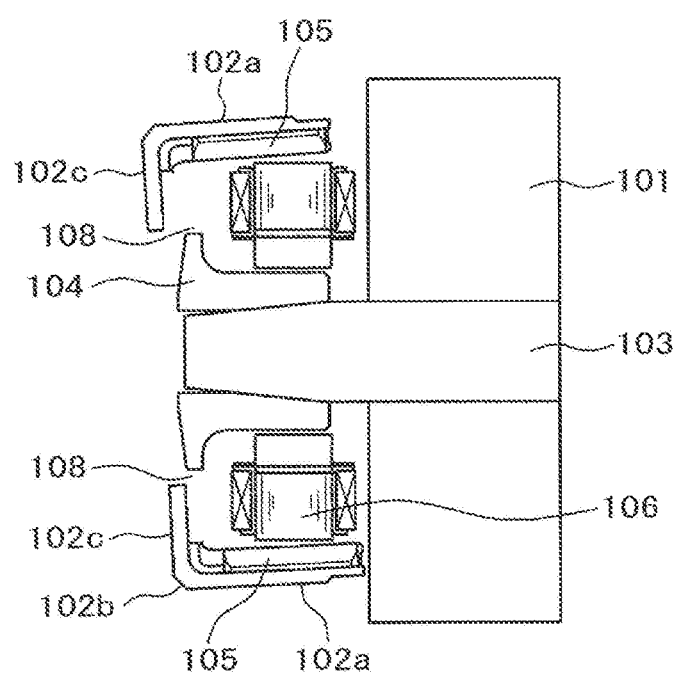
FIG. 22 is an explanatory view of a flywheel after breakage in a conventional ACG.

FIG. 12 is a plan view of a flywheel according to Example 4 of the present invention, FIG. 13 is a sectional side view of the flywheel likewise, and a stator in the interior of the flywheel is omitted in the figures.

The reference sign 31 represents a bowl-like flywheel and the flywheel includes a metal-made (iron-made) tube-like cylindrical section 31a and a disk-like ceiling section 31b and 31d. The reference sign 33 represents a metal-made (iron-made) boss formed in the center of the ceiling section 31b and 31d and a tapered hole to pass through an output shaft of an engine not shown in the figures is formed.

In Example 4, at least a part of the ceiling section is formed of the same synthetic resin as Example 1. Specifically, the ceiling section includes a resin-made ceiling section 31b and a thin metal-made (iron-made) ceiling section 31d arranged in the manner of lying over the upper surface of the ceiling section 31b.

The metal-made ceiling section 31d is formed integrally with the metal-made cylindrical section 31a and boss 33 and includes six spokes connecting the cylindrical section 31a and the boss 33 as shown in the figures and the synthetic-resin-made ceiling section 32b is formed between the spokes.

By configuring the ceiling section with a combination of a metal and a synthetic resin in this way, the axes of the boss and the cylindrical section can be centered and simultaneously the strength of the ceiling section can be enhanced. The strength of the ceiling section can be adjusted by the number and the thickness of the spokes.

Next, assuming that rotation continues in the state where a part of the ceiling section breaks by a severe vibration or impact given to the flywheel 31 rotating together with an engine, the metal-made ceiling section 31d melts, then even when lock occurs by solidification, the area of the solidified part of the metal is small, impact by the lock is small, and hence impact on a driver is also small. Here, although the synthetic-resin-made ceiling section 31b also breaks, then melts, and successively solidifies, the synthetic-resin-made ceiling section 31b is in the melting state when the metal solidifies and hence does not influence the impact by the lock.

EXAMPLE 5

FIG. 14 is a sectional side view of a flywheel according to Example 5 of the present invention and a stator in the interior of the flywheel is omitted in the figure.

The reference sign 41 represents a bowl-like flywheel and the flywheel includes a synthetic-resin-made tube-like cylindrical section 41a and a disk-like ceiling section 41b and 41d. The reference sign 43 represents a metal-made (iron-made) boss formed in the center of the ceiling section 41b and 41d and a tapered hole to pass through an output shaft of an engine not shown in the figure is formed.

In Example 5, at least a part of the ceiling section is formed of the same synthetic resin as Example 1. Specifically, the ceiling section includes a synthetic-resin-made ceiling section 41b and a thin metal-made (iron-made) ceiling section 41d configured in the manner of being embedded into the ceiling section 41b.

An end of the metal-made ceiling section 41d extends inside the cylindrical section 41a and constitutes a part of the cylindrical section and the other end is formed integrally with the boss 43. The thin metal-made ceiling section 41d includes either a plurality of spokes or a thin plate covering the whole ceiling section.

By configuring the ceiling section with a combination of a metal and a synthetic resin in this way, similarly to Example 4, the axes of the boss and the cylindrical section can be centered and simultaneously the strength of the ceiling section can be enhanced. The strength of the ceiling section can be adjusted by the number and the thickness of the spokes and, when the whole ceiling section is covered, by the thickness of the metal plate.

Further, similarly to Example 4, assuming that rotation continues in the state where a part of the ceiling section breaks by a severe vibration or impact given to the flywheel 41 rotating together with an engine, the metal-made ceiling section 41d melts, then even when lock occurs by solidification, the area of the solidified part of the metal is small, impact by the lock is small, and hence impact on a driver is also small. Here, although the synthetic-resin-made ceiling section 41b also breaks, then melts, and successively solidifies, the synthetic-resin-made ceiling section 41b is in the melting state when the metal solidifies and hence does not influence the impact by the lock.

REFERENCE SIGNS LIST 1, 11, 21, 31, 41 . . . flywheel,
1a, 11a, 21a, 31a, 41a, 102a . . . cylindrical section,
1b, 11b, 21b, 31b, 31d, 41b, 41d, 102c . . . ceiling section,
1c, 11c, 21c . . . shoulder section,
1d . . . inner circumferential section,
1e . . . outer circumferential section,
1f, 21f . . . reluctor,
2, 12, 22, 106 . . . stator,
3, 13, 23, 33, 43, 104 . . . boss,
3a, 13a, 23a, 104a . . . tapered hole,
4, 14, 24, 105 . . . permanent magnet,
7 . . . annular hole,
8 . . . synthetic resin,
11d . . . part of cylindrical section,
11e . . . remaining part of cylindrical section,
14a, 24a . . . end face of permanent magnet,
24b . . . magnetic path,
5, 15, 25 . . . laminated steel plate,
6, 16, 26, 106a . . . coil,
27 . . . yoke, 28 . . . magnet case,
101 . . . engine,
102 . . . flywheel,
102b . . . shoulder section,
103 . . . rotation axis (output shaft),
107 . . . crankcase,
108 . . . break portion

The invention claimed is:

1. A magnet generator comprising a rotor including a bowl-like flywheel having a cylindrical section and a ceiling section, a plurality of permanent magnets arranged over an inner circumferential wall surface of the cylindrical section, and a boss attached to an output shaft of a prime mover, and a stator facing the permanent magnets, fixed to the prime mover side inside the flywheel, and including iron cores and coils,
   wherein, in the flywheel, the ceiling section includes a resin-made ceiling section formed of a synthetic resin and a metal-made ceiling section formed integrally with the boss and the cylindrical section,
   wherein, in the flywheel, the metal-made ceiling section includes at least two spokes connecting the boss and the cylindrical section, and
   wherein the resin-made ceiling section is formed to entirely fill a region between the at least two spokes.

2. The magnet generator according to claim 1,
   wherein, in the flywheel, a part of the ceiling section on the outer circumferential side of the boss is formed of a synthetic resin and the remaining part is formed of a metal.

3. The magnet generator according to claim 1,
   wherein, in the flywheel, the metal-made ceiling section includes a thin plate connecting the boss and the cylindrical section.

4. The magnet generator according to claim 1,
   wherein, in the flywheel, the ceiling section and a part of the cylindrical section ranging to the ceiling section are formed of a synthetic resin and the remaining part of the cylindrical section is formed of a metal.

5. The magnet generator according to claim 4,
   wherein, a boundary between the synthetic resin and the metal in the cylindrical section of the flywheel is located in the vicinity of an end face of the permanent magnets on the ceiling section side of the flywheel.

6. The magnet generator according to claim 1,
   wherein the synthetic resin and the metal in the flywheel adhere to each other with an adhesive.

7. The magnet generator according to claim 1,
   wherein the flywheel is formed of a synthetic resin covering the ceiling and the cylindrical section and has a cylindrical yoke formed by arranging a magnetic body along the outer circumferential surface of the permanent magnets.

8. The magnet generator according to claim 7,
   wherein the flywheel is formed by embedding the permanent magnets, the boss, and the yoke into a synthetic resin.

9. The magnet generator according to claim 8,
   wherein the permanent magnets are embedded into the synthetic resin so that the end faces of the permanent magnets may be exposed outside from the synthetic resin.

10. The magnet generator according to claim 9,
    wherein the yoke is set so as to have a mass that gives a predetermined inertia to the flywheel.

11. The magnet generator according to claim 1,
    wherein the synthetic resin is a thermosetting synthetic resin.

12. The magnet generator according to claim 1,
    wherein the synthetic resin is a thermoplastic non-crystalline resin.

13. The magnet generator according to claim 1,
    wherein the synthetic resin is a thermoplastic crystalline resin having a melting point of 800° C. or lower.

14. The magnet generator according to claim 11,
    wherein the synthetic resin is a non-flammable, flame-retardant, or self-extinguishing resin.

15. The magnet generator according to claim 11,
    wherein the synthetic resin contains a fibrous material.

* * * * *